United States Patent
Huang et al.

(10) Patent No.: US 10,008,117 B1
(45) Date of Patent: Jun. 26, 2018

(54) MASTER-SLAVE COMPATIBLE PDC SYSTEM

(71) Applicant: Tung Thih Electron (Xiamen) CO., LTD., Xiamen, Fujian (CN)

(72) Inventors: Chengbiao Huang, Fujian (CN); Xiong Wang, Fujian (CN); Jie Fu, Fujian (CN); Jiangmiao Wu, Fujian (CN); Shuifang Huang, Fujian (CN); Junfeng Shen, Fujian (CN)

(73) Assignee: Tung Thih Electron (Xiamen) Co., Ltd., Xiamen (CN)

( * ) Notice: Subject to any disclaimer, the term of this patent is extended or adjusted under 35 U.S.C. 154(b) by 0 days. days.

(21) Appl. No.: 15/703,957

(22) Filed: Sep. 13, 2017

(51) Int. Cl.
*B60Q 1/48* (2006.01)
*G08G 1/14* (2006.01)
*H04W 84/20* (2009.01)
*H04L 29/08* (2006.01)
*G01S 15/93* (2006.01)

(52) U.S. Cl.
CPC ............. *G08G 1/144* (2013.01); *H04L 67/12* (2013.01); *H04W 84/20* (2013.01); *G01S 2015/932* (2013.01)

(58) Field of Classification Search
CPC .................................. G01S 1/00; H04B 1/00
See application file for complete search history.

(56) References Cited

U.S. PATENT DOCUMENTS

2010/0245066 A1* 9/2010 Sarioglu ................. G01S 7/003
340/436
2010/0277297 A1* 11/2010 Eckel ...................... G01S 7/524
340/435

FOREIGN PATENT DOCUMENTS

| CN | 1892249 A | 1/2007 |
| CN | 102129076 A | 7/2011 |
| CN | 103592649 A | 2/2014 |

* cited by examiner

*Primary Examiner* — Shirley Lu

(57) ABSTRACT

A master-slave compatible PDC system, comprising a master sensor, at least one slave sensor, which comprises an ultrasonic IC, a boost drive module, and a second ultrasonic transducer; the CPU module drives the first ultrasonic transducer via the master drive module, the first ultrasonic transducer amplifies and transmits echoed signals to a A/D conversion module of the CPU module via a master amplifier module, the CPU module drives the ultrasonic IC of the corresponding slave sensor via a slave drive module, the ultrasonic IC drives the second ultrasonic transducer via the boost drive module, and the second ultrasonic transducer feeds back the echoed signal to the A/D conversion module of the CPU module via the ultrasonic IC. In the Invention, the ultrasonic IC is employed for each slave sensor, enabling a farther detection distance and stronger anti-interference capability of the whole system.

7 Claims, 5 Drawing Sheets

MASTER-SLAVE COMPATIBLE PDC SYSTEM

TECHNICAL FIELD

The Invention relates to the field of parking distance control (PDC) system, particularly to a master-slave compatible PDC system.

BACKGROUND ART

As shown in FIG. 1, the conventional PDC system usually comprises a control box 71, multiple sensors 72, at least one reminder 73, the multiple sensors 72 are respectively connected to the control box 71 and coordinate with each other under the control of the control box 71, wherein, each of the multiple sensors 72 separately detects and transmits the data of any obstacle to the control box 71 for processing. The control box 71 analyzes the data and judges the distance and orientation of the obstacle. When the distance of the obstacle meets the designated conditions, the control box 71 informs the reminder 73 and gives out an alarm. The multiple sensors 72 are set on the external sides of the vehicle body according to demands, for example, front and rear bumpers, and the control box 71 is set in the vehicle. The signal transmission and power supply feed between the multiple sensors 72 and the control box 71, etc. are very complex, not only increasing the cables and the cost of the control box 71, but also causing interference due to too long data cable, because about 4 sensors 72 will usually be used and set at a certain interval.

To address the above problem, a PDC system without host is developed. For details, please refer to Chinese patent CN1892249A. As shown in FIG. 2, it comprises at least one master sensor and one or more slave sensors 82. The master sensor 81 has the obstacle detection function and coordinately controls working sequence of the slave sensors 82; by virtue of its obstacle detection function via the master sensor 91 and coordinated control over working sequence of the slave sensors 82, the control box 71 is substituted, thus eliminating the effect of the control box 71; meanwhile, because the master sensor 81 and the slave sensors 82 are set on the bumpers, the whole PDC system can shorten the length of the data cable and realize test implementation on the bumper, thus increasing the vehicle test efficiency.

As shown in FIG. 3, the Chinese Patent CN102129076A developed by the Applicant to overcome the defect of the patent relates to a cascade-structure PDC system without host, comprising multiple sensors 91, wherein the first terminal of each of the multiple sensors 91 is connected to the second terminal of the adjacent sensor 91 via internal network 92 to form a cascade structure and realize information transmission among the multiple sensors 91. The system is characterized by high response efficiency, high production and installation efficiency and high radar accuracy.

Nevertheless, in the above two patents, either the master sensor 81 and the slave sensor 82 in Chinese patent CN1892249A or the multiple sensor 91 in Chinese patent CN102129076A comprises respectively a microprocessor, i.e. each sensor is a digital probe with CPU, thus causing a high cost.

As shown in FIG. 4, Chinese Patent CN103592649A developed by the Applicant continuously to overcome the defect of the patent relates to an integrated PDC system, comprising a master sensor and at least one slave sensor, wherein, the master sensor 1 comprises a CPU module 11, a first ultrasonic transducer 12, a master drive module 13, a master amplifier module 14 and at least one slave drive module 15. In the CPU module 11, an A/D conversion module is provided. The CPU module 11 drives the first ultrasonic transducer 12 via the master drive module 13. The first ultrasonic transducer 12 amplifies and transmits echoed simulation signals to the A/D conversion module of the CPU module 11 via the master amplifier module 14. Each slave sensor 2 is a simulation probe without CPU. The CPU module 11 drives a slave sensor 2 via a slave drive module 15; each slave sensor 2 transmits the echoed simulation signal to the A/D conversion module of the CPU module 11. Each slave sensor 2 comprises a boost drive module 21, a second ultrasonic transducer 22 and an amplifier module 23. The boost drive module 21 locates between the slave drive module 15 and the second ultrasonic transducer 22 for the secondary drive. The slave amplifier module 23 amplifies and transmits the echoed simulation signal to the A/D conversion module of the CPU module 11. The signal line and the power line between the master sensor and the slave sensor are integrated, i.e. current is also transmitted on the signal line and signal is also transmitted on the power line. The master sensor of the integrated PDC system serves as not only a controller but also a probe; at least one slave sensor only plays a role as a probe and is connected to the master sensor for communication, further making the whole PDC system realize all functions as same as the existing PDC system with or without host.

Nevertheless, the Applicant finds out that it can be further optimized, for example, such properties as capacity, detection distance (about 1.5 cm), energy, signal amplitude and anti-interference performance can be further improved.

SUMMARY OF THE INVENTION

For this purpose, the Invention is to propose a master-slave compatible PDC system with further improved performance.

The technical solution applied is:

A master-slave compatible PDC system, comprising a master sensor and at least one slave sensor; the master sensor comprises a CPU module, a first ultrasonic transducer, a master drive module, a master amplifier module, slave drive modules and power supply modules; the quantity of the slave drive modules is equivalent to that of the slave sensors, making the slave drive modules connected with the slave sensors correspondingly; the slave sensor is a digital probe without CPU and comprises an ultrasonic IC, a boost drive module, and a second ultrasonic transducer; the CPU module drives the first ultrasonic transducer via the master drive module, the first ultrasonic transducer amplifies and transmits echoed signals to an A/D conversion module of the CPU module via the master amplifier module, the CPU module drives the ultrasonic IC of the corresponding slave sensor via a slave drive module, the ultrasonic IC drives the second ultrasonic transducer via the boost drive module, and the second ultrasonic transducer feeds back the echoed signal to the A/D conversion module of the CPU module via the ultrasonic IC.

Further, the power supply comprises a first power supply module for the CPU module and a second power supply module for each slave sensor.

Further, the enclosure of the slave sensor comprises 3PINs, comprising a signal PIN from the ultrasonic IC, a negative PIN and a positive PIN; the enclosure of the master sensor comprises more than 3N PINs, comprising a signal PIN from the slave drive module, a negative PIN and a positive PIN from the second power supply; the negative PIN and the positive PIN of the second power supply are correspondingly connected to the ones of the slave sensor; the signal PIN of the slave drive module is correspondingly connected to the PIN of the ultrasonic IC.

Further, the CPU modules can send communication commands to each ultrasonic IC for regulating the configuration parameters of each ultrasonic IC.

Further, the CPU module of the said master sensor forms input ports respectively receiving R reversing signals, SPD speed signals and SWT switch signals.

Further, the CPU module of the sensor forms output ports respectively outputting BUZZER sounds, LED control signals and DATA communications.

Further, the quantity of the slave sensors is 1-11.

The beneficial effects of the Invention lie in that:

With the ultrasonic IC for each slave sensor, the whole system has a farther detection distance and more strong anti-interference capability.

BRIEF DESCRIPTION OF THE DRAWINGS

In order to illustrate the technical scheme in the embodiments of the Invention or in prior art more clearly, the drawings required in description of the embodiments or prior art will be introduced briefly as follows. Obviously, the drawings described below are just a part of the embodiments of the Invention. A person skilled in the art is able to obtain other drawings according to these drawings without any creative work.

DETAILED DESCRIPTION OF THE PREFERRED EMBODIMENTS

A clear and full description of the technical schemes of the embodiments of the Invention will be given in combination of the drawings as follows. Obviously, the described embodiments are just preferable ones rather than the whole embodiments of the Invention. Based on the embodiments of the Invention, any other embodiments obtained by a person skilled in the art without any creative work will fall within the protection scope of the Invention.

Figure 1:
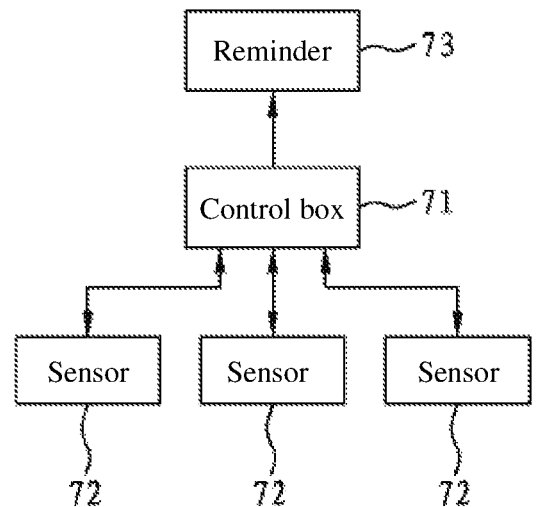
FIG. 1 is the structure diagram of a conventional PDC system.
Figure 2:
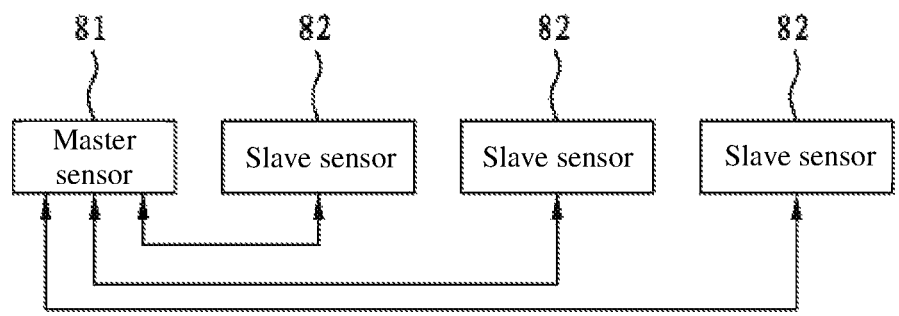
FIG. 2 is the structure diagram of a PDC system without host.
Figure 3:
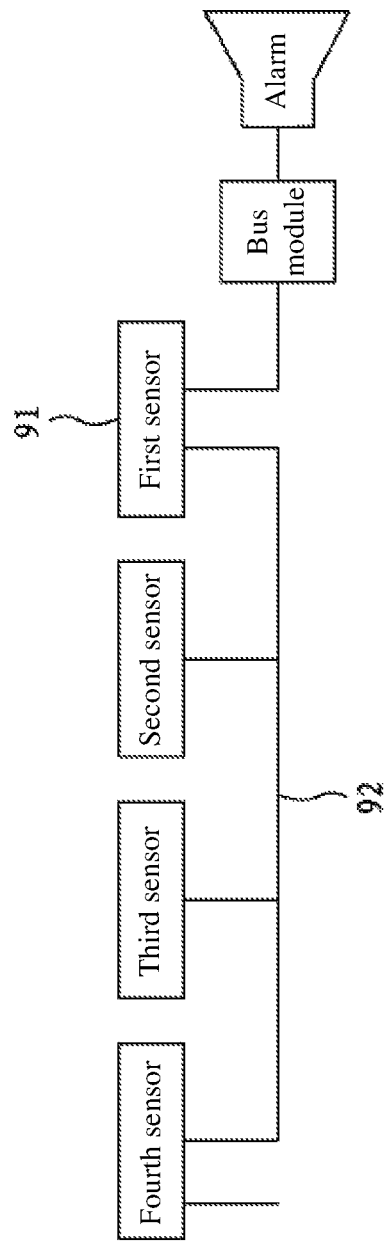
FIG. 3 is the structure diagram of a cascade-structure PDC system without host.
Figure 4:
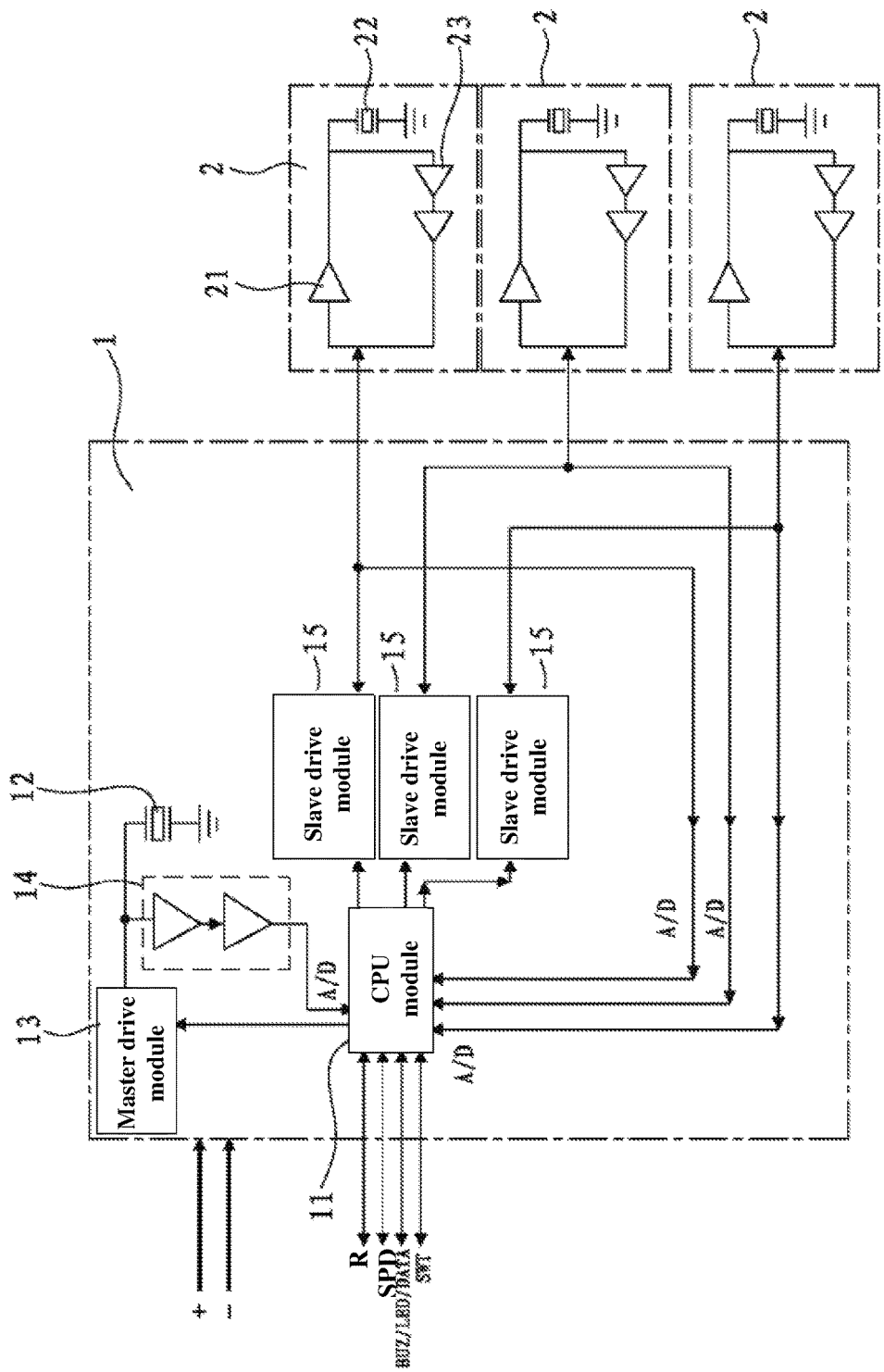
FIG. 4 is the internal structure diagram of an integrated PDC system.
Figure 5:
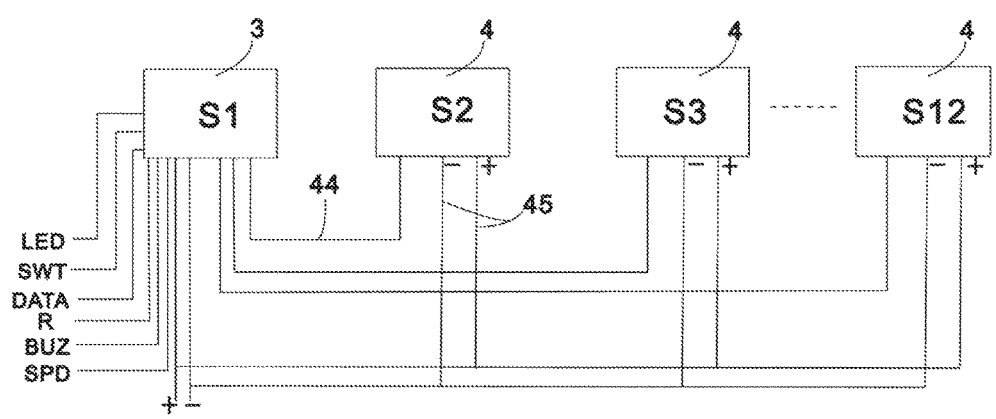
FIG. 5 is the structure diagram of a master-slave compatible PDC system.
Figure 6:
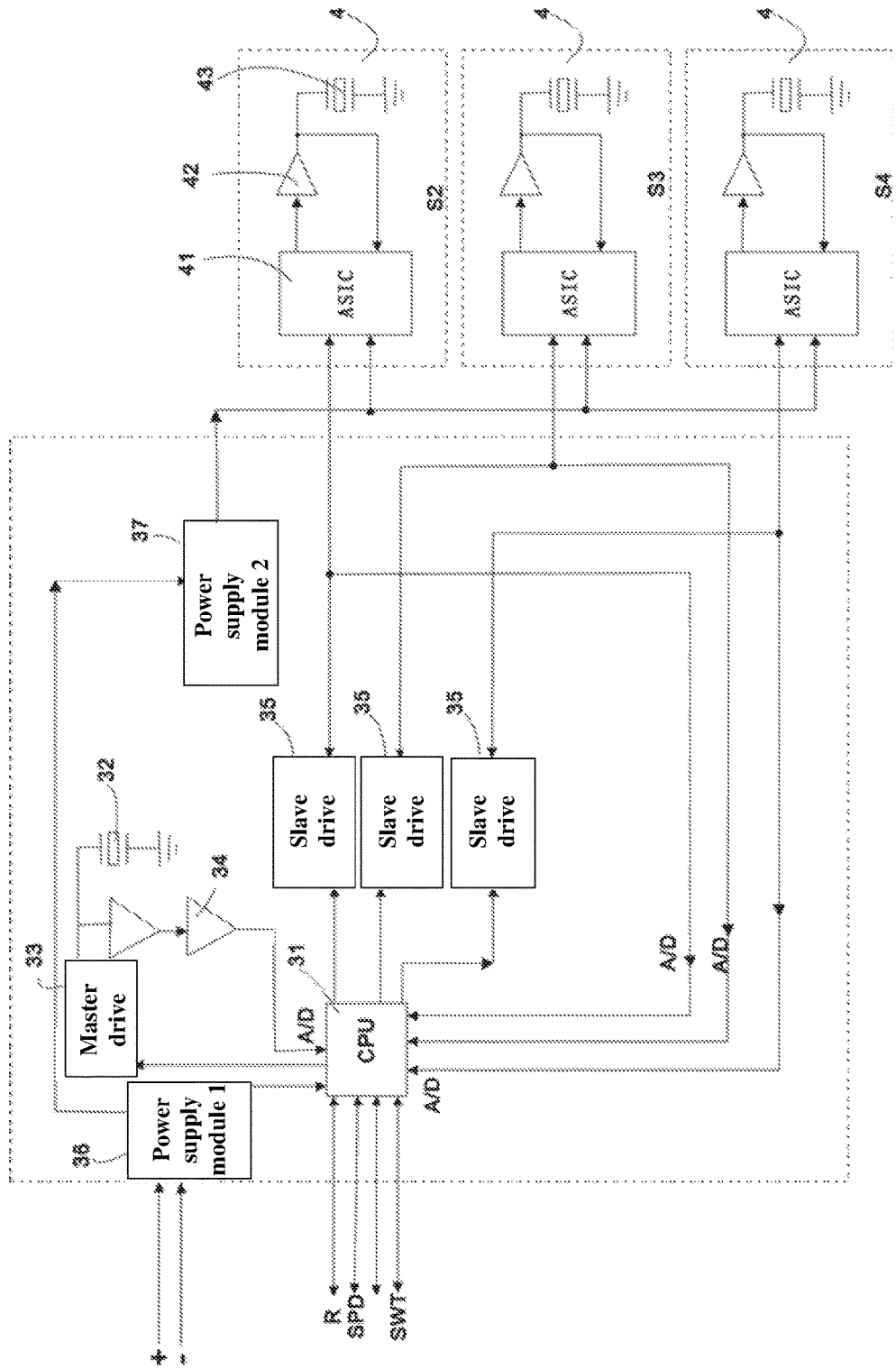
FIG. 6 is the internal structure diagram of the master-slave compatible PDC system as shown in FIG. 5.

As shown in FIG. 5 and FIG. 6, a master-slave compatible master-slave compatible PDC system, comprising a master sensor 3 and at least one slave sensor 4 with its quantity set based on actual installation requirements, for example, 1, 2, 3, 4, 5, 6, 7, or 11 at most. The present embodiment will be described taking 11 sensors as the example. The master sensor is marked as Sensor 1, abbreviated as S1, and 11 slave sensors as Sensor 2-Sensor 12, abbreviated as S2-S12. FIG. 6 shows only three slave sensors 4.

The master sensor 3 has a CPU module 31, a first ultrasonic transducer 32, a master drive module 33, a master amplifier module 34, a slave drive module 35, and power supply modules 36, 37; The quantity of the drive modules 35 is equivalent to that of the slave sensor 4, making the drive module 35 connected to the slave sensor 4 correspondingly, for example, 11 slave sensors correspond to 11 drive modules, and vice versa. The slave sensor 4 is a digital probe without CPU, and comprises an ultrasonic IC 41, a boost drive module 42, and a second ultrasonic transducer 43. The CPU module 31 drives the first ultrasonic transducer 32 via the master drive module 33, the first ultrasonic transducer 32 transmits the echoed signal to an A/D conversion module of the CPU module 31 via the master amplifier module 34, and the CPU module 31 drives the ultrasonic signal IC 41 of the corresponding slave sensor 4 via the drive module 35, the ultrasonic IC 41 drives the second ultrasonic transducer 43 via the boost drive module 42, and the second ultrasonic transducer 43 feeds back the echoed signal to the A/D conversion module of the CPU module 31 via the ultrasonic IC 41.

With the ultrasonic IC (i.e. ASIC) in all the slave sensors, farther detection distance and stronger anti-interference capacity can be realized; the ultrasonic IC integrates power supply voltage regulator, launch drive, receiving amplification, digital processing and digital output. The CPU module of the master sensor can send communication commands to each ultrasonic IC for regulating the configuration parameters of each ultrasonic IC. Internal configurable parameters of ASIC (i.e., ultrasonic IC) include but are not limited to the following:

1. Amplification gain (signal amplification);
2. Drive current (drive power);
3. Cut threshold (the threshold to capture the effective signal);
4. Filtering bandwidth (after bandwidth of some interferences is filtered, the effective signal can enter);
5. Drive frequency (to be consistent with the frequency of the ultrasonic transducer itself);
6. Temperature value (internal ASIC problems can be read out);
7. Detection distance (allowed detection distance);
8. Transmitting pulse (pulse counts emitted, the larger the pulse count number is, the greater the energy is, and the farther the detection distance is);
9. User memory (to store some production information, such as version number, and production date, etc.);

Communication commands between the CPU module and the ASIC: If the CPU module gives the ASIC different low-level widths, it means different commands, for example, wave transmission command, monitoring command, wave transmission and monitoring command, and such internal IC parameters as amplification gain, drive current, drive frequency, cut threshold and other configuration parameters can be done under the control of digital communication commands of the CPU module, and the configuration parameters can be permanently saved or configured when the power is ON.

As a further modified embodiment, the power supply modules of the master-slave compatible PDC system comprise a first power supply module 36 for the CPU module 31 and a second power supply module 36 for each of the slave sensors 4. In order to make the second power supply module supply power independently, as shown in FIG. 5 and FIG. 6, the enclosure of the slave sensor comprises 3 PINs, i.e., a signal PIN from the ultrasonic IC, a negative PIN and a positive PIN; the enclosure of the master sensor comprises more than 3N PINs, i.e., a signal PIN from the slave drive module, a negative PIN and a positive PIN from the second power supply; the negative PIN and the positive PIN of the second power supply are correspondingly connected to the ones of the slave sensor; the signal PIN of the slave drive module is correspondingly connected to the PIN of the ultrasonic IC.

The signal cable 44 and the power supply cable 45 are provided separately and act independently to each other so that the power supply cable 45 transmits only the current, and the signal cable 44 transmits only the signal, making the detection distance of the PDC system larger, up to 2.5-5 cm; separate arrangement of the signal cable and the power supply cable can better realize the function of ASIC and make ASIC provide more energy, thus generating more stable and reliable signals on the signal cable and stronger anti-interference capacity due to less interference of the power supply with the signal cable.

Therefore, power is supplied to each slave sensor independently through the second power supply, and the power supply cable and the signal cable are arranged separately to cooperate with the ASIC of each slave sensor and provide the master-slave compatible PDC system with better properties including capacity, detection distance, energy, signal amplitude, anti-jamming and others.

Based on the improved performance, the slave sensors S2-S8 are controlled by the master sensor S1 in parallel and can be multiplexed at the same time to achieve a multi-shot, multiple-received signal processing and improve the response speed. For example, the master sensor S1 sends a monitoring signal, and the slave sensors S2-S8 feed back monitoring signals in parallel; multiple transmissions mean multiple receiving; under the circumstance of no interference from the power supply cable, the response speed of the signal cable is greatly enhanced. Additionally, the master sensor S1 serves as a probe too, and can also be controlled by the CPU module, and monitored simultaneously with the slave sensors S2-S8.

As shown in FIG. 5 and FIG. 6, the CPU module of the master sensor can also form an input port for receiving the R reversing signal, the SPD speed signal and the SWT switching signal respectively; the CPU module of the master sensor can also form output ports respectively outputting the BUZZER sounds, the LED control signals and the DATA communications; In addition, it can also have hard wires/LIN/CAN directly connected to other parts of the vehicle, so that the data of the entire master-slave compatible PDC system can be sent to the other parts of the vehicle in order to give out alarms.

The foregoing is only practicable embodiments of the Invention, and could not be understood as limiting the protection scope of the Invention. All equivalent embodiments or changes made by utilizing the technical schemes of the specification shall be included within the protection scope of the Invention.

The invention claimed is:

1. A master-slave compatible parking distance control (PDC) system, comprising a master sensor and at least one slave sensor; the master sensor comprises a central processing unit (CPU) module, a first ultrasonic transducer, a master drive module, a master amplifier module, slave drive modules and power supply modules; the quantity of the slave drive modules is equivalent to that of the slave sensors, making the slave drive modules connected with the slave sensors correspondingly; the slave sensor is a digital probe without CPU and comprises an ultrasonic integrated circuit (IC), a boost drive module, and a second ultrasonic transducer; the CPU module drives the first ultrasonic transducer via the master drive module, the first ultrasonic transducer amplifies and transmits echoed signals to an analog-to-digital (A/D) conversion module of the CPU module via the master amplifier module, the CPU module drives the ultrasonic IC of the corresponding slave sensor via a slave drive module, the ultrasonic IC drives the second ultrasonic transducer via the boost drive module, and the second ultrasonic transducer feeds back the echoed signal to the A/D conversion module of the CPU module via the ultrasonic IC.

2. The master-slave compatible PDC system according to claim 1, wherein, the power supply modules comprise a first power supply module for the CPU module and a second power supply module for each slave sensor.

3. The master-slave compatible PDC system according to claim 2, wherein, the enclosure of the slave sensor comprises 3 PINs, comprising a signal PIN from the ultrasonic IC, a negative PIN and a positive PIN; the enclosure of the master sensor comprises more than 3N PINs, comprising a signal PIN from the slave drive module, a negative PIN and a positive PIN from the second power supply module; the negative PIN and the positive PIN of the second power supply module are correspondingly connected to the ones of the slave sensor; the signal PIN of the slave drive module is correspondingly connected to the PIN of the ultrasonic IC.

4. The master-slave compatible PDC system according to claim 1, wherein, the CPU module sends communication commands to each ultrasonic IC for regulating the configuration parameters of each ultrasonic IC.

5. The master-slave compatible PDC system according to claim 1, wherein, the CPU module of the master sensor forms input ports respectively receiving R reversing signals, SPD speed signals and SWT switch signals.

6. The master-slave compatible PDC system according to claim 1, wherein, the CPU module of the sensor forms output ports respectively outputting BUZZER sounds, LED control signals and DATA communications.

7. The master-slave compatible PDC system according to claim 1, wherein, the quantity of the slave sensors is 1-11.

* * * * *